United States Patent Office 3,004,845
Patented Oct. 17, 1961

3,004,845
STABLE FORMULATIONS OF PLANT GROWTH STIMULANT
Raymond J. La Pierre, Iselin, N.J., assignor to Merck & Co., Inc., Rahway, N.J., a corporation of New Jersey
No Drawing. Filed Jan. 23, 1958, Ser. No. 710,604
10 Claims. (Cl. 71—2.4)

This invention relates to stable, water soluble, solid formulations of the plant growth stimulant, gibberellic acid compounds. More particularly, the invention relates to improved plant growth stimulant formulations wherein a water soluble gibberellic acid compound in small proportion is associated with diammonium phosphate as a water soluble solid carrier and stabilizer for the gibberellic acid compound.

Procedures for the isolation of plant growth stimulants known as gibberellins from fermentation broth produced in the fermentation of nutrient medium with the organism *Gibberella fujikuroi* were originally developed in Japan and reported in Chemical Abstracts. (10814–10818, 1950). More recently English workers have reported in J. Chem. Soc. (London), p. 4670, 1954, and in Chemistry and Industry, p. 1066, 1954, the preparation of gibberellic acid (gibberellin X); and Stodola et al. in the United States have reported, Arch. Biochem. and Biophys. 54, 240 (1955), the preparation by fermentation of mixtures of gibberellin A and gibberellin X and the recovery of gibberellin A and gibberellin X separately therefrom.

Of the various gibberellic acid compounds obtainable from fermentation broths, gibberellic acid, having the empirical formula $(C_{18}H_{21}O_4)COOH$, and water soluble salts thereof, such as the potassium salt, the ammonium salt, or the ethyl or butyl esters have been found to be particularly effective in practical application as plant growth stimulants. In water solution the gibberellic acid compounds lose their plant growth stimulant activity quite rapidly on standing and it is, therefore, important in the practical use and distribution of these materials to employ anhydrous extenders, including, for example, water soluble solid extenders. Unfortunately, however, many of the water soluble substances which might normally be considered as appropriate extenders show incompatibilities with the gibberellic acid compounds leading to loss of growth stimulant activity. Such incompatibilities are particularly pronounced in efforts to combine gibberellic acid compounds with foliar fertilizers. In such fertilizers, the presence of nitrate or urea and the normally acidic condition, as well as traces of moisture which are normally present, all contribute to the instability of the gibberellic acid compounds.

It has now been found, according to the present invention, that the stability problems with the gibberellic acid compounds can be overcome or substantially reduced by employing as a water soluble solid carrier or extender diammonium phosphate $(NH_4)_2HPO_4$. Not only is the diammonium phosphate fully compatible with the gibberellins, but it is also compatible with and protects the gibberellic acid compounds in the presence of many of the components, including surface active agents, coloring agents, plant nutrient components, and the like, with which it is desirable to have the gibberellic acid compounds associated in various types of use formulations.

The stabilizing and protective properties of the diammonium phosphate for the gibberellic acid compounds appear to be quite specific and unique since no other water soluble solid carrier has been found to even closely approach diammonium phosphate in effectiveness as a stabilizing extender.

In general, stabilized formulations, in accordance with the present invention, will include by weight about 0.1 to 15 parts of potassium gibberellate or other gibberellic acid compound, 70 to 99 parts of diammonium phosphate, and about 0.5 to 12.5 parts of an additive or mixture of additives having properties of wetting agents or special properties enhancing the characteristics of the formulations for particular intended uses.

By way of illustration, dry formulations of potassium gibberellate in the form of free-flowing powders can be provided which will readily dissolve in predetermined amounts of water to form aqueous solutions for application to plants as by spraying or the like. In such formulations, the additive suitably includes an anti-caking agent such as silica gel so that the powdered product remains free flowing in the dry state. Other anti-caking agents such as talc, powdered limestone, or the like could be employed, but have the disadvantage of producing distinctly cloudy or milky aqueous preparations. Accordingly, silica gel is considered a preferred form of anti-caking agent and is effective in amounts of about 1% by weight of the dry formulation. The dry, free flowing preparations can include anti-caking agent alone or associated with a wetting agent, suitably in the amount of about 1% by weight of the dry formulation. When the product is intended for use as a plant growth stimulant per se, i.e., not combined with other materials such as foliar fertilizer, the concentration of gibberellic acid compound is preferably in the range of about 0.1 to 1.5%.

A further modification of the invention pertains to granular forms of the stabilized gibberellic acid compound which are particularly suited for incorporation in dry foliar fertilizer preparations. In providing granules for such purpose, one practical approach is to first form tablets of substantial size and then to mechanically break these tablets to an appropriate granule size which will completely pass through a 20 mesh sieve. The discrete particles thus formed, and containing suitably about 0.1%–15% of gibberellic acid compound, form a mechanical barrier protecting the major portion of the gibberellic acid compound when the granules are combined with foliar fertilizer components which are incompatible with the gibberellic acid compound. While a limited amount of gibberellic acid compound exposed at the surface of such granules may be inactivated by such incompatible fertilizer components, the major portion within the granules remains protected in the dry state, and when a foliar fertilizer containing such granules of gibberellic acid compound is dissolved in water and applied to plants the gibberellic acid compound remains available in substantial amounts to provide its growth stimulant activity.

Tablets for use in preparing granules from gibberellic acid compounds suitable for inclusion in foliar fertilizer can be tablets especially prepared for rapidly dissolving in water and containing as a surface active agent about 2% of a substance such as polyoxyethylene (20), sorbitan mono-oleate (commercially prepared as "Tween 80") which also functions as a lubricant facilitating tablet formation. The preparation of such tablets is separately disclosed and claimed in an application currently being filed by McClelland and Hanus Serial No. 714,938, filed February 13, 1958.

A preferred manner of preparing such granules involves combining gibberellic acid, or a water soluble salt or ester thereof and diammonium phosphate with Carbowax 6000, or other similar polyethylene glycol having a molecular weight within the range of about 3000 to 7500, at elevated temperature sufficient to melt the polyethylene glycol which normally exists as a hard, waxy solid. The mixture is thoroughly blended together and cooled with rapid agitation to thereby form directly a granular product suitable to use as an additive to foliar fertilizers.

The formation of granules from a polyethylene glycol melt in this manner provides even greater protection to the gibberellic acid compound than does the formation of granules from preformed tablets. The reason for this appears to be due to a more complete coating of the granules by polyethylene glycol film, an explanation which is substantiated by the fact that mechanical breakdown of granules formed from a melt to smaller size particles (exposing additional surface formed by fracture of the larger particles) results in an appreciable increase in activity loss when the granules are combined with fertilizer components such as nitrates and urea which are known to inactivate gibberellic acid compounds.

While the present invention is not concerned with particular composite formulations of foliar fertilizer and plant growth stimulant, it is to be noted that the stabilized granules of the type above described, and particularly those formed from a polyethylene glycol melt, are suitable for inclusion in many of the water soluble solid foliar fertilizers presently on the market. For combining with a particular foliar fertilizer it will be apparent that the granule size of the stabilized gibberellic acid compound formulation should be so selected as to maintain uniformity in a dry composite mixture during periods of storage and handling. Thus while particles passing through a 20 mesh sieve may be generally suitable for use in foliar fertilizers, it will be apparent that the particular particle size and the range of particle size permitted may vary from one type of fertilizer to another.

The amount of solid gibberellic acid compound formulation to be combined with a foliar fertilizer will depend on the recommended use of the foliar fertilizer, but should provide about 10 p.p.m. of gibberellic acid compound in the resulting aqueous fertilizer solution. Thus, if the foliar fertilizer is utilized at the rate of 10 gm. (one tablespoon) per gallon, the gibberrellic acid compound concentration should be equivalent to about 37 mg. of potassium gibberellate per 10 gm. of foliar fertilizer. In practical terms this would be about 170 gm. of 1% gibberellic acid compound granules, or 17 gm. of 10% gibberellic acid compound granules, in a pound of foliar fertilizer.

It will be noted that the diammonium phosphate which forms the unique carrier or extender in the stable preparations of potassium gibberellate herein disclosed, although not normally a substance employed as a fertilizer is nevertheless valuable as a source of both nitrogen and phosphorus for plants.

The following examples will serve to show typical stabilized gibberellic acid compound formulations in accordance with the present invention, but it is to be understood that these examples are given by way of illustration and not of limitation:

*Example I*

Five different free-flowing powder formulations of stabilized potassium gibberellate were prepared by blending together the components as noted in the following tabulation, the quantities in each instance being expressed in percent by weight.

| Component | Formulation | | | | |
|---|---|---|---|---|---|
| | A | B | C | D | E |
| Potassium Gibberellate, percent | 0.2 | 0.25 | 0.48 | 0.25 | 0.25 |
| Silica gel | 1.0 | 1.0 | 1.0 | 1.0 | 1.0 |
| $(NH_4)_2HPO_4$ | 98.8 | 97.75 | 97.52 | 97.75 | 97.41 |
| Sodium lauryl sulfate | | 1.0 | 1.0 | | 1.0 |
| Alkyl benzene sodium sulfate (Ultrawet K) | | | | 1.0 | |
| FD&C yellow No. 5 | | | | | 0.07 |
| FD&C green No. 1 | | | | | 0.27 |

Each of these formulations was stored at elevated temperature, 50° C., in an accelerated stability test, one month at 50° C. being comparable to about 6 to 8 months at room temperature, with the following observed results concerning activity:

Formulation:                 Observation
    A_____ No loss after 7 weeks (bean assay); no loss after 8 weeks (chemical assay).
    B_____ No loss after 5 weeks (chemical assay).
    C_____ No loss after 3 weeks (chemical assay).
    D_____ No loss after 1 week (chemical assay).
    E_____ No loss after 7 weeks (bean assay).

The bean assay is conducted as follows:

Individually potted Pinto bean plants growing in a greenhouse at 26° C. about 12 to 14 days old and having a relatively uniform height are selected for test purposes. Groups of two or more plants are separately treated by spraying (both sides of the leaves) with solutions diluted to provide concentrations of 0.25, 0.5, 1.0 and 2.0 p.p.m. of potassium gibberellate, such dilutions being based upon the percent of potassium gibberellate originally in the test sample. Three or four of the selected plants are left untreated as controls. Five days after treatment, the sprayed plants and the control plants are measured to determine the increase in height due to the treatment. Comparison of such data for the samples as originally prepared and for the samples after extended storage at 50° C. gives a clear indication of the comparative activity; and a similar growth response in plants treated with initially prepared samples and with samples stored at extended periods at 50° C. indicates no loss in activity during such storage.

*Example II*

Tablets of stabilized potassium gibberellate were prepared containing by weight:

|  | Percent |
|---|---|
| Potassium gibberellate | 0.4 |
| $(NH_4)_2HPO_4$ | 97.6 |
| Polyoxyethylene (20) sorbitan mono-oleate ("Tween 80") | 2.0 |

Blending of the components was effected by grinding together the potassium gibberellate and a small amount of the diammonium phosphate, and progressively adding the balance of the phosphate with thorough mixing, blending a small amount of this mixture with the "Tween 80" and then progressively adding the balance of the first mixture with thorough mixing. The final mixture was compressed into 1 gm. tablets each containing 0.3 mg. of potassium gibberellate. (Note that if potassium gibberellate of less than 100% concentration or purity is used the amount of impure material should be appropriately increased in the formulation to provide tablets each containing the equivalent of 0.3 mg. of pure potassium gibberellate.)

These tablets were broken up to form granules, and a 30–80 mesh fraction of the granules was studied for stability. The 30–80 mesh fraction of granules was blended with urea to a level of 0.025% potassium gibberellate. After one month at 45–50° C. this mixture showed about 5% loss in potassium gibberellate (by chemical assay).

As a control, a quantity of the starting mixture (without tableting and granulation) was blended with urea to a level of 0.025% potassium gibberellate. After one month at 45–50° C. this mixture showed a 54% loss in potassium gibberellate. The granular form of the product is therefore markedly more stable in the presence of urea.

*Example III*

Granules of stabilized potassium gibberellate were prepared by first heating 877.88 gm. of $(NH_4)_2HPO_4$ to about 60–65° C. in a mechanical mixer, then melting 100 gm. of polyethylene glycol, Carbowax 6000, at 60–65° C. and suspending therein 12.12 gm. of potassium gibberellate, blending this suspension in the warm $(NH_4)_2HPO_4$ and cooling with rapid agitation. The resulting granules were separated into two fractions, by size:

(a) All through 20 mesh sieve.
(b) Tops of 20 mesh sieve.

Fraction b was milled to pass through a 20 mesh sieve, and the two fractions were separately blended with urea to a level of 0.1% potassium gibberellate. The resulting mixtures were stored for 6 weeks at 45–50° C. together with a comparable control (without any granulation), with the following observed loss of activity:

| | Percent |
|---|---|
| Fraction a | 4 |
| Fraction b | 13 |
| Control | 60–70 |

The above data indicate that unmilled granules, as formed initially by the "melt" procedure described afford substantially greater stability to the potassium gibberellate than granules formed by breaking down of larger particles, but that both types of granules are vastly superior to an ungranulated formulation in the presence of urea.

In the foregoing examples the active substance has been potassium gibberellate for the reason that this gibberellic acid salt is considered the salt of choice from the standpoint of water solubility, cost, and effectiveness as a plant growth stimulant. It is to be understood, however, that the special formulations of the type herein disclosed can be effectively employed with other water soluble gibberellic acid compounds such as gibberellic acid ammonium gibberellate, or the ethyl and butyl esters of gibberellic acid in providing free-flowing powders, tablets, and granules having enhanced stability characteristics. In thus varying the formulations it should be noted that the activity of the gibberellic acid compounds differ slightly depending on molecular weight of the acid, salt, or ester moiety. Thus for example, approximately equivalent plant growth stimulant activity is provided by 15 parts of potassium gibberellate, 12 parts of gibberellic acid, 14.2 parts of ethyl gibberellate, and 16.3 parts of butyl gibberellate. These comparisons are based on the pure gibberellic acid compounds, and appropriate adjustment in the amount of gibberellic acid compound must also be made of gibberellic acid compound of less than 100% purity is employed.

Various changes and modifications in the compositions and procedures herein disclosed will occur to those skilled in the art, and to the extent that such changes and modifications are embraced by the appended claims, it is to be understood that they constitute part of my invention.

I claim:
1. A water soluble solid plant growth stimulant preparation comprising a homogeneous mixture of about 0.1 to 15 parts by weight of a gibberellic acid compound selected from the group consisting of gibberellic acid and the potassium and ammonium salts and lower alkyl esters thereof, and about 70 to 99 parts by weight of diammonium phosphate, said diammonium phosphate acting as a stabilizer for said gibberellic acid compound.

2. A water soluble solid plant growth stimulant preparation as defined in claim 1, wherein the homogeneous mixture includes about 0.5 to 12.5 parts by weight of a compatible surface active agent.

3. A water soluble solid plant growth stimulant preparation as defined in claim 1, wherein the homogeneous mixture includes about 1% of silica gel as an anti-caking agent.

4. A water soluble solid plant growth stimulant preparation as defined in claim 1, wherein the homogeneous mixture includes about 1% of silica gel as an anti-caking agent and about 1% of a compatible surface active agent.

5. A water soluble solid plant growth stimulant preparation as defined in claim 1, wherein the homogeneous mixture includes about 10 parts by weight of a compatible surface active agent, and said composition being in the form of granular particles with part of said surface active agent distributed homogeneously within said particles and a portion thereof forming enveloping films on said particles.

6. A free-flowing, water soluble, solid preparation of potassium gibberellate comprising by weight about 0.1 to 1.5 parts of potassium gibberellate, 96 to 99 parts of diammonium phosphate, and about 1 part of silica gel, said diammonium phosphate acting as a stabilizer for the potassium gibberellate.

7. A free-flowing, water soluble, solid preparation of potassium gibberellate as defined in claim 6, containing in uniform mixture therewith about 1 part by weight of a compatible surface active agent.

8. A granular water soluble solid preparation of potassium gibberellate having enhanced stability in admixture with foliar fertilizers, said granular preparation comprising particles of suitably graded size wherein each of the particles is a homogeneous mixture of about 0.1 to 15 parts by weight of potassium gibberellate and about 70 to 97 parts by weight of diammonium phosphate associated with 0.5 to 12.5 parts by weight of a compatible surface active agent, said diammonium phosphate acting as a stabilizer for the potassium gibberellate.

9. A granular water soluble solid preparation of potassium gibberellate as defined in claim 8, wherein said surface active agent is polyoxyethylene (20) sorbitan monooleate and is present in the amount of about 2 parts by weight.

10. A granular water soluble solid preparation of potassium gibberellate as defined in claim 8 wherein the surface active agent is polyethylene glycol having an average molecular weight within the range of about 3000 to 7500, said polyethylene glycol being in the amount of about 10 parts by weight with part of said polyethylene glycol distributed homogeneously within said particles and a portion thereof forming enveloping films on said particles.

References Cited in the file of this patent

UNITED STATES PATENTS

| 2,396,513 | Jones | Mar. 12, 1946 |
| 2,792,295 | Wright | May 14, 1957 |

FOREIGN PATENTS

| 123,579 | Australia | Feb. 12, 1947 |
| 783,611 | Great Britain | Nov. 24, 1957 |

(Other references on following page)

OTHER REFERENCES

Yabuta in "Chemical Abstracts," vol. 44, 1950, cols. 10814–10817.

King et al. in "Contributions Boyce Thompson Institute," Apr.–June 1951, pp. 267–278.

Thompson et al. in "Indus. and Engr. Chem.," vol. 41, No. 3, March 1949, pp. 485–494.

"Santocel," published by Monsanto Chemical Co., St. Louis, Mo., 1956.

"Carbowax Compounds and Polyethylene Glycols" (Carbowax et al.), published by Carbide and Carbon Chemicals Corp., New York, N.Y., June 30, 1946.

Research in "Chem. and Engr. News," Sept. 17, 1956, pp. 4496 and 4497.

Barton; "Contributions Boyce Thompson Inst.," July–Sept. 1956, pp. 311–317.